United States Patent
Oshima

(10) Patent No.: US 9,811,298 B2
(45) Date of Patent: Nov. 7, 2017

(54) IMAGE FORMING SYSTEM FOR PRINTING USING AN IMAGE FORMING DEVICE BY SELECTING A GROUP NAME THAT THE IMAGE FORMING DEVICE BELONGS TO

(71) Applicant: FUJI XEROX CO., LTD., Tokyo (JP)

(72) Inventor: Akihide Oshima, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/810,557

(22) Filed: Jul. 28, 2015

(65) Prior Publication Data
US 2016/0274828 A1    Sep. 22, 2016

(30) Foreign Application Priority Data

Mar. 19, 2015 (JP) ................................ 2015-056917

(51) Int. Cl.
*G06F 3/12* (2006.01)

(52) U.S. Cl.
CPC ............ *G06F 3/126* (2013.01); *G06F 3/1205* (2013.01); *G06F 3/1291* (2013.01)

(58) Field of Classification Search
CPC ...... G06F 3/126; G06F 3/1205; G06F 3/1291; G06F 3/1261; G06F 3/1296
USPC ....................................................... 358/1.15
See application file for complete search history.

(56) References Cited

U.S. PATENT DOCUMENTS

| 2002/0186410 | A1* | 12/2002 | Tanaka | G06F 3/1213 358/1.15 |
|---|---|---|---|---|
| 2003/0002077 | A1* | 1/2003 | Shima | G06F 3/1222 358/1.15 |
| 2003/0142348 | A1* | 7/2003 | Hiramatsu | G06F 3/1212 358/1.15 |
| 2004/0190042 | A1* | 9/2004 | Ferlitsch | H04N 1/00233 358/1.15 |
| 2005/0248803 | A1* | 11/2005 | Ohara | G06F 3/1209 358/1.15 |
| 2007/0013934 | A1* | 1/2007 | Hashimoto | H04N 1/00278 358/1.13 |

(Continued)

FOREIGN PATENT DOCUMENTS

| JP | 2008-97512 A | 4/2008 |
|---|---|---|
| JP | 2008-99090 A | 4/2008 |

*Primary Examiner* — Eric A Rust
(74) *Attorney, Agent, or Firm* — Sughrue Mion, PLLC

(57) ABSTRACT

An image forming system includes plural image forming apparatuses. The image forming system includes the following elements. A first communication unit of each image forming apparatus communicates with at least another one of the plural image forming apparatuses. A second communication unit communicates with a terminal device. An image forming unit forms an image on a medium. A storage unit stores liaison information which defines liaison concerning an operation between each of the plural image forming apparatuses and at least another one of the plural image forming apparatuses. A notifying unit notifies the terminal device of the liaison information in response to an inquiry from the terminal device. A receiving unit receives specified image data and liaison information from the terminal device. An execution unit executes image formation on the basis of the received image data by using the image forming unit of one of the plural image forming apparatuses.

23 Claims, 7 Drawing Sheets

(56) References Cited

U.S. PATENT DOCUMENTS

| | | | | |
|---|---|---|---|---|
| 2007/0024895 A1* | 2/2007 | Clark | ................... | G06F 3/1204 |
| | | | | 358/1.15 |
| 2007/0046987 A1* | 3/2007 | Shima | ................... | G06F 3/1215 |
| | | | | 358/1.15 |
| 2014/0268209 A1* | 9/2014 | Yokoyama | .............. | G06F 3/121 |
| | | | | 358/1.14 |
| 2014/0371895 A1* | 12/2014 | Sadusk | ................. | B33Y 10/00 |
| | | | | 700/98 |

* cited by examiner

FIG. 4

| GROUP ID INFORMATION ~G1 | TERMINAL HANDLING POLICY ~DM2 | | PRINT POLICY ~DM3 | | APPARATUS IN CHARGE OF MANAGEMENT ~DM4 | COLLECT POLICY ~DM5 |
|---|---|---|---|---|---|---|
| ID | NAME | SEARCH REQUEST | PRINT REQUEST | APPARATUS IN CHARGE OF STORAGE | APPARATUS IN CHARGE OF PRINTING | | |
| 01 | ELEVATOR HALL | HANDLING (SUBJECT APPARATUS RESPONDING/REQUESTING ANOTHER APPARATUS TO RESPOND /IGNORE) | HANDLING (SUBJECT APPARATUS RESPONDING/REQUESTING ANOTHER APPARATUS TO RESPOND /IGNORE) | 200-2 | 200-2 | 200-3 | INFORMING USER OF APPARATUS IN CHARGE/PRINTING BY SUBJECT APPARATUS |

L1

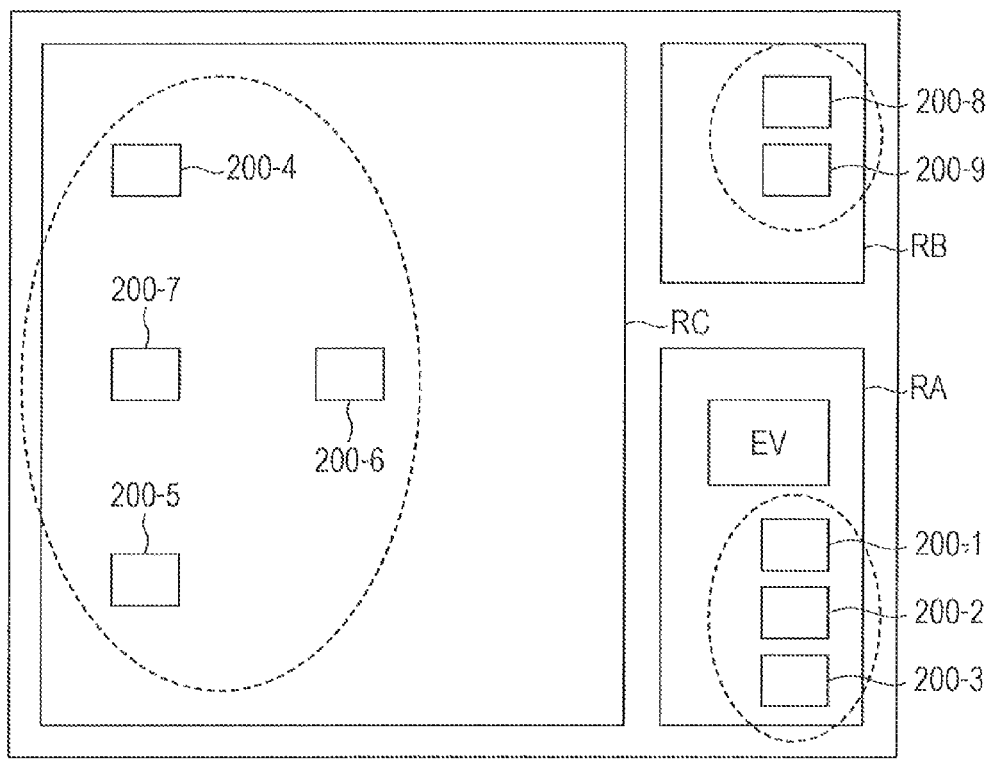

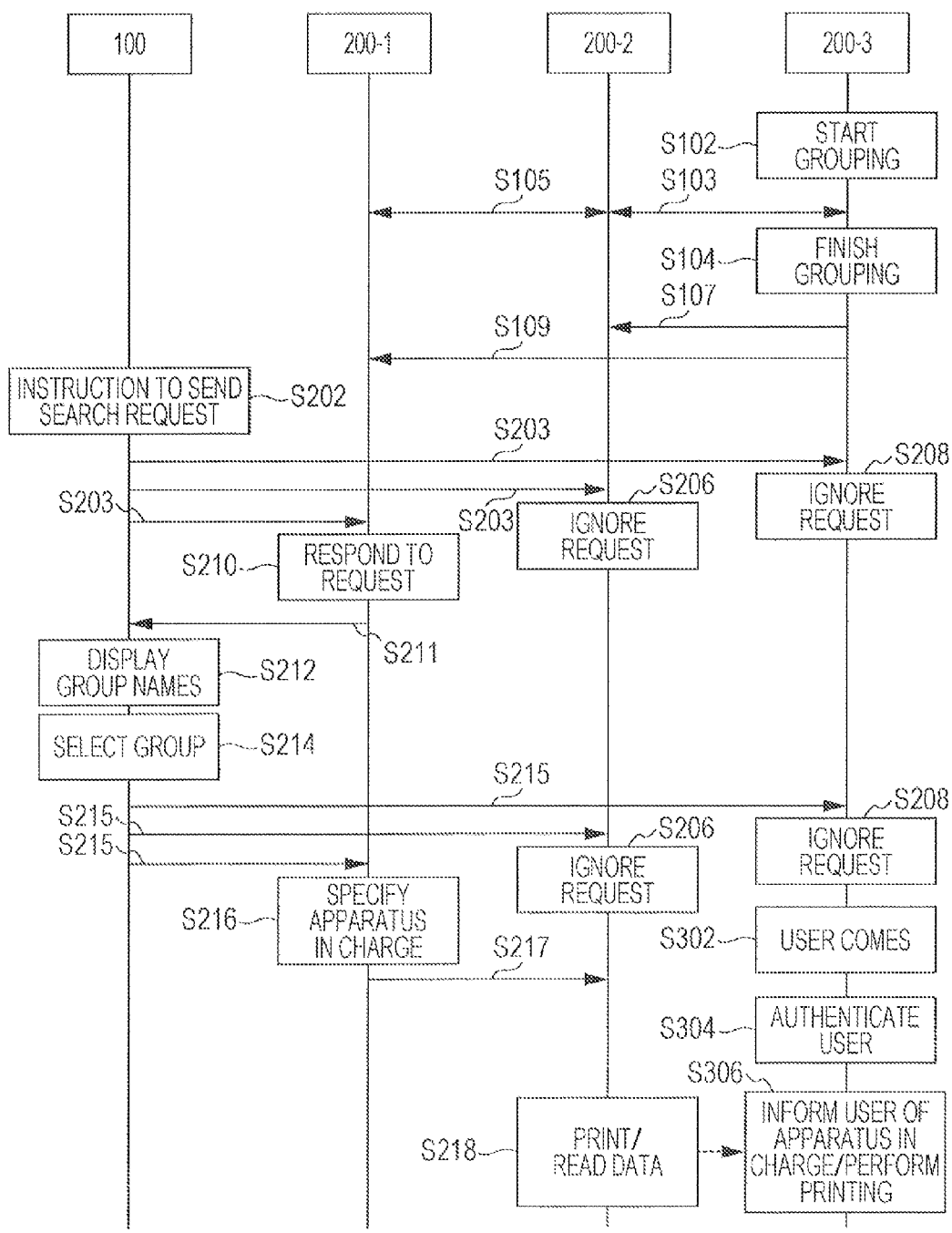

IMAGE FORMING SYSTEM FOR PRINTING USING AN IMAGE FORMING DEVICE BY SELECTING A GROUP NAME THAT THE IMAGE FORMING DEVICE BELONGS TO

CROSS-REFERENCE TO RELATED APPLICATIONS

This application is based on and claims priority under 35 USC 119 from Japanese Patent Application No. 2015-056917 filed Mar. 19, 2015.

BACKGROUND (i) Technical Field

The present invention relates to an image forming system for performing image formation by using multiple available image forming apparatuses, and also to an image forming apparatus, a control method for an image forming apparatus, and a non-transitory computer readable medium.

(ii) Related Art

When performing printing by using a terminal device, a list of multiple printers that are accessible from this terminal device is displayed, and a user is instructed to select a printer from this list.

SUMMARY

According to an aspect of the invention, there is provided an image forming system including plural image forming apparatuses. The image forming system includes: a first communication unit that is disposed in each of the plural image forming apparatuses and that communicates with at least another one of the plural image forming apparatuses; a second communication unit that is disposed in each of the plural image forming apparatuses and that communicates with a terminal device; an image forming unit that is disposed in each of the plural image forming apparatuses and that forms an image on a medium; a storage unit that stores liaison information which defines liaison concerning an operation between each of the plural image forming apparatuses and at least another one of the plural image forming apparatuses; a notifying unit that notifies the terminal device of the liaison information in response to an inquiry from the terminal device; a receiving unit that receives specified image data and specified liaison information from the terminal device; and an execution unit that executes image formation on the basis of the received image data by using the image forming unit of one of the plural image forming apparatuses.

BRIEF DESCRIPTION OF THE DRAWINGS

An exemplary embodiment of the present invention will be described in detail based on the following figures, wherein:

FIG. 4 illustrates an example of the structure of liaison information LI;

FIG. 5 illustrates an example of grouping;

FIG. 6A illustrates an example of the structure of a job table JT;

FIG. 6B illustrates an example of the structure of a function management table FT;

FIG. 7 is a flowchart illustrating an operation performed by the image forming system;

DETAILED DESCRIPTION

Figure 9:
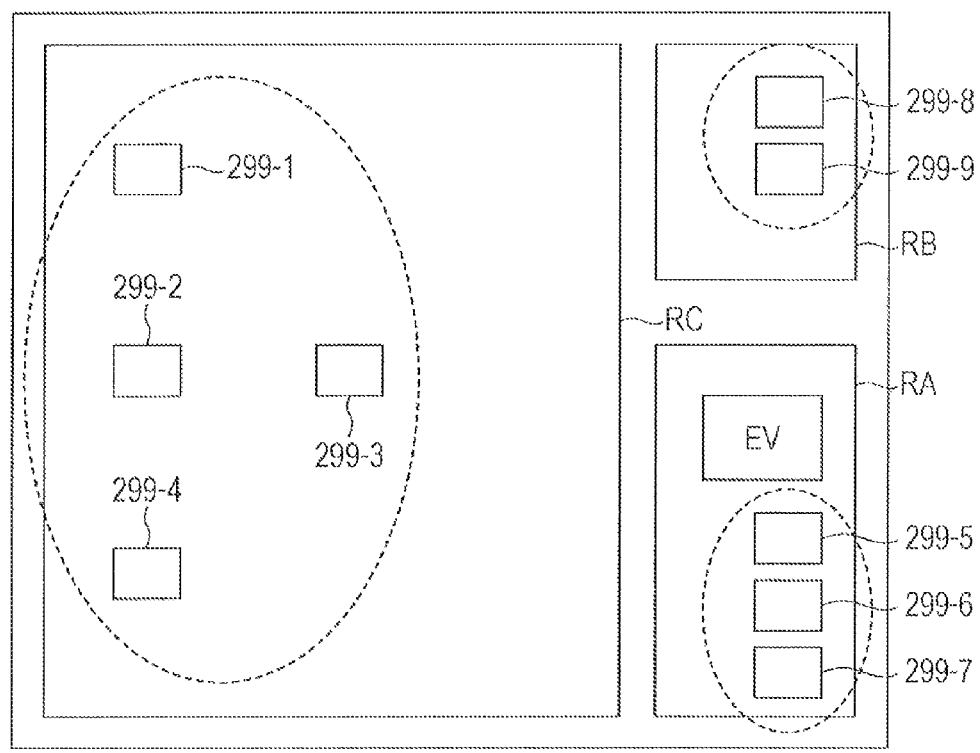
FIG. 9 illustrates an example of the layout of image forming apparatuses.

In a space where plural users are present, such as in an office, multiple printers are installed at different positions, and each user sends a print instruction to a certain printer by using, for example, a mobile terminal, via wireless communication. FIG. 9 illustrates an example of a floor plan of a space where multiple printers are installed. In the example shown in FIG. 9, on a floor including an office space RC, a lounge space RB, and an elevator hall RA, nine printers 299-1 through 299-9 are installed. Among the nine printers 299-1 through 299-9, some printers are installed together in one area, and some printers are separately installed.

In this situation, in the related art, when performing printing by using a mobile terminal, a user first makes an inquiry about whether there are some printers connectable to the mobile terminal (searches for such printers). Then, a list of items of information (typically, printer names) concerning printers that have responded to the inquiry made by the user is displayed on the mobile terminal. When the user selects the printer name of a desired printer, a print instruction is sent to the selected printer, together with image data to be printed. Then, the user goes to an area where the printer is installed to collect a printed document. In this manner, a user is able to select a printer which is installed near the user or which is not occupied. According to this related art, it is thus more convenient for a user than a case in which a printer to be used by the user is fixed.

Figure 10:
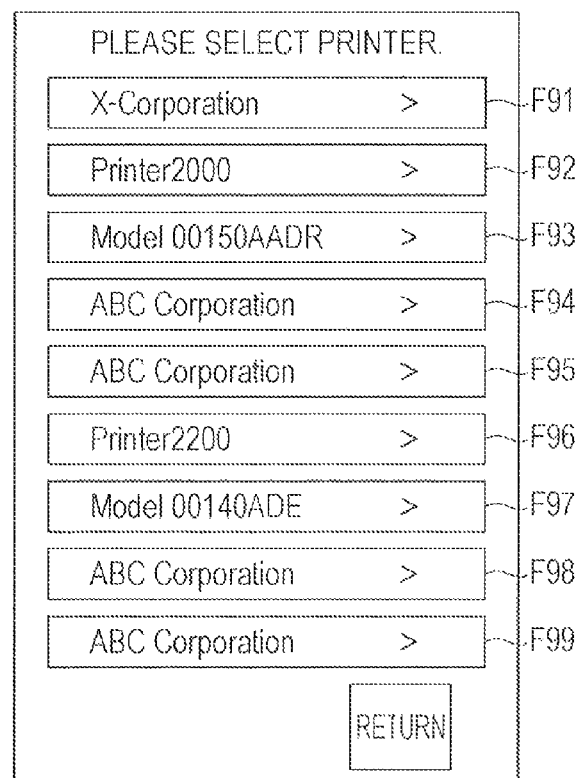
FIG. 10 illustrates an example of a screen displayed on a terminal device of the related art.

Upon receiving a request from a terminal device, such as a mobile terminal, via wireless communication, each of the printers 299-1 through 299-9 returns the name of its own printer or another item of identification (ID) information to the mobile terminal according to a predetermined protocol. If nine printers have been detected, predetermined ID names (such as model numbers, company names, and model names indicated by F91 through F99 in FIG. 10) of all the nine printers are displayed on a screen on the mobile terminal, as shown in FIG. 10. In this case, if the user tries to select a printer different from a usual one or if printers responding to a request from the user are frequently changed, it is difficult for the user to associate the printer names displayed on the screen with the actual printers. If the user selects a printer name displayed on the screen in this situation without knowing the actual printer associated with the displayed printer name, the user may have to spend a lot of time to find a printed material.

Even if the user knows the associations between the displayed printer names and the actual printers, it is not always the case in which the user selects a right printer. The user may not be able to understand the operating status of a printer, such as in a case in which a selected printer is unseen from the user. The user goes to a printer to collect a printed material, and may find that the printer is occupied and have to wait until a user's job is started.

Figure 1:
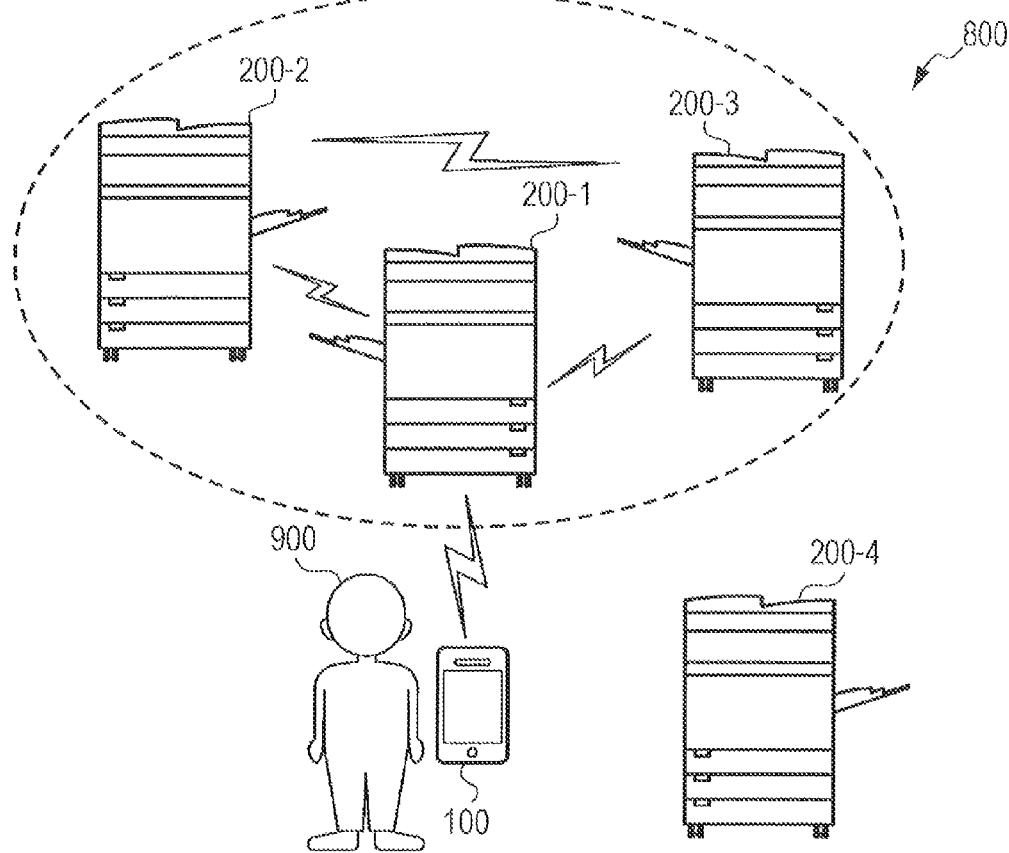
FIG. 1 is a conceptual diagram of an image forming system.

FIG. 1 is a conceptual diagram of an image forming system 800. The image forming system 800 includes a mobile terminal 100 and plural image forming apparatuses 200 (image forming apparatuses 200-1 through 200-4). Among these image forming apparatuses 200, some image forming apparatuses 200 having a predetermined relationship (for example, they are installed close to each other) forms one group with each other, and operate in response to a request from a user 900 in cooperation with each other according to certain rules within the group. In the example shown in FIG. 1, the image forming apparatuses 200-1, 200-2, and 200-3 form one group.

For the sake of convenience, in FIG. 1, within the image forming system 800, one mobile terminal 100, four image forming apparatuses 200, and one group of image forming apparatuses 200 are shown. However, the number of mobile terminals 100, the number of image forming apparatuses 200 included in one group, and the number of groups within the image forming system 800 are not restricted.

Figure 2:
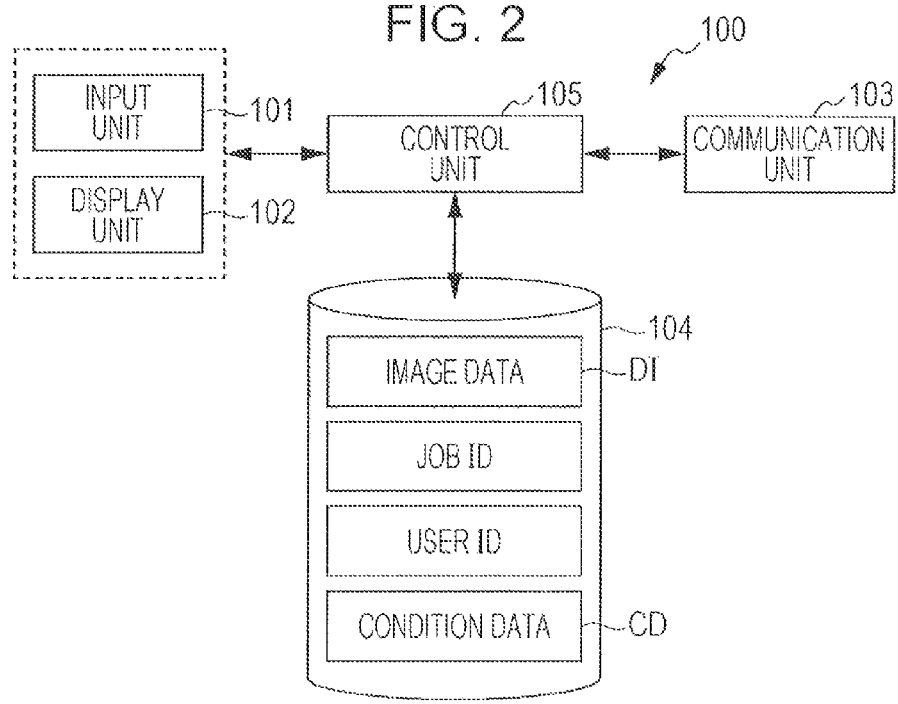
FIG. 2 is a functional block diagram of a mobile terminal.

FIG. 2 is a functional block diagram of the mobile terminal 100. The mobile terminal 100, which is a general-purpose mobile terminal or a smartphone, is carried by a user and has a wireless data communication function and an information input/output function. More specifically, the mobile terminal 100 includes an input unit 101, a display unit 102, a communication unit 103, a storage unit 104, and a control unit 105.

The display unit 102 is implemented by a display device, such as a liquid crystal display. The display unit 102 generates a screen based on liaison information LI and presents the screen to the user 900.

The liaison information LI is information shared by one or more image forming apparatuses 200 which forms a group, and defines, not only information for identifying this group, but also information concerning how to handle access from the mobile terminal 100 and information concerning how to perform processing concerning image formation on the basis of an instruction received from the mobile terminal 100. The information concerning how to handle access from the mobile terminal 100 includes information indicating whether or not a response will be returned and, if a response is returned, information indicating the content of information to be supplied to the mobile terminal 100. The information concerning the image formation includes information to be referred to when determining which image forming apparatus 200 within the group to be used for storing image data or for forming an image.

The input unit 101 is an input device, such as keys, buttons, or a touch panel, operated by the user 900. The input unit 101 is used for giving an instruction to search for the image forming apparatuses 200, to perform printing, and to specify image data used for printing. The input unit 101 and the display unit 102 may be integrally provided as a touch panel. The communication unit 103 is a wireless communication interface for performing wireless communication according to the predetermined wireless communication standards, such as Wifi-Direct (registered trademark), Bluetooth (registered trademark), Near Field Communication (NFC), ZigBee (registered trademark), or AirPrint (registered trademark).

The storage unit 104 is a storage device, such as a semiconductor memory. The storage unit 104 stores programs, such as an operating system (OS), executed by the control unit 105 so as to implement functions, which will be discussed later. The storage unit 104 also stores image data DI used for printing, job ID, and user ID. The job ID is information for uniquely identifying print processing (job), which is generated when a print instruction is executed. The user ID is information for identifying the source that has sent a print instruction, and is, for example, the name or the ID number of a user or a terminal identifier (NFC authenticating ID or a serial number of a wireless communication module). In the storage unit 104, print condition data CD indicating conditions and restrictions (such as the image quality, speed, running cost, and additional features) to be considered for selecting an image forming apparatus 200 may also be stored.

The control unit 150 is a processor, such as a central processing unit (CPU), and controls the input unit 101, the display unit 102, the communication unit 103, and the storage unit 104. More specifically, in response to an instruction from the user 900, the control unit 105 causes the communication unit 103 to send a search request and the display unit 102 to display a screen based on group identification (ID) information GI received from the image forming apparatuses 200. When the user 900 gives an instruction to perform printing, the control unit 105 reads image data DI and sends it to the image forming apparatus 200, together with necessary information (such as job ID, user ID, and print condition data CD).

Figure 3:
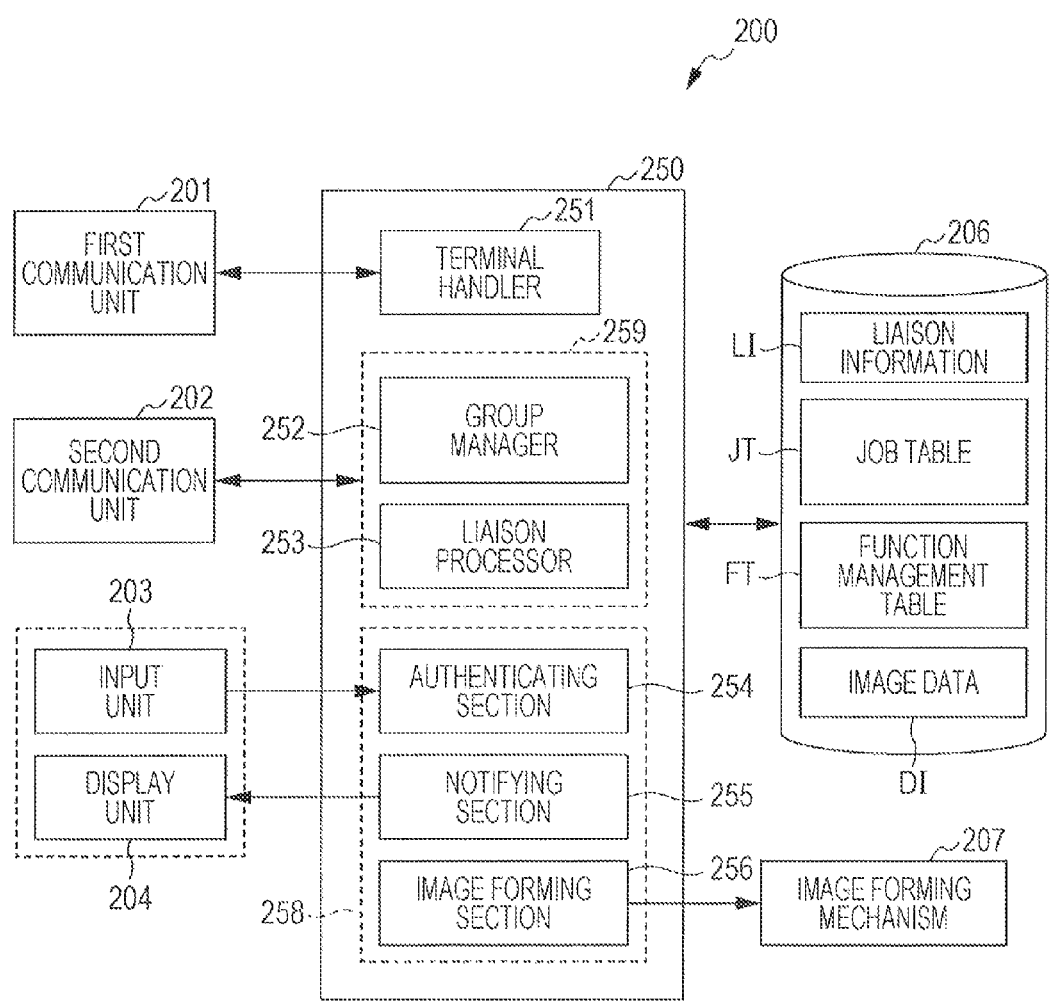
FIG. 3 is a functional block diagram of an image forming apparatus.

FIG. 3 is a functional block diagram of the image forming apparatus 200. The image forming apparatus 200 has a basic function as a printer for forming and outputting an image by communicating with the mobile terminal 100. The image forming apparatus 200 may also have optional functions concerning the formation of images, such as copying, scanning, transferring of scan data, FAX sending and receiving, and stapling. More specifically, the image forming apparatus 200 includes a first communication unit 201, a second communication unit 202, an input unit 203, a display unit 204, a control unit 250, a storage unit 206, and an image forming mechanism 207.

The image forming mechanism 207 includes an image processor, a developing device, a photoconductor, a light source, toner, and a recording medium, such as paper, and forms an image on a recording medium on the basis of image data DI.

The display unit 204 is implemented by a display device, such as a liquid crystal display, and supplies information necessary for the user 900 to receive a printed material to the user 900. More specifically, the display unit 204 generates a screen based on the liaison information LI and presents the generated screen to the user 900. The input unit 203 is an input device, such as keys, buttons, or a touch panel, operated by the user 900, and is used for specifying a job or conducting user authentication. The input unit 203 and the display unit 204 may be integrally provided as a touch panel.

The storage unit 206 is a built-in or external storage device, such as a hard disk or a semiconductor memory. The storage unit 206 stores the following program. When this program is executed by a processor, it executes a step of obtaining liaison information which defines liaison concerning operations to be performed between this image forming apparatus 200 and one or more image forming apparatuses 200 by communicating with one or more image forming apparatuses 200 and a step of executing processing in accordance with this liaison information upon receiving a request from the mobile terminal 100 via wireless communication. This program may be stored in a storage medium and installed in each image forming apparatus 200, or may be downloaded into each image forming apparatus 200 via the Internet.

The storage unit 206 also stores image data DI used for printing obtained from the mobile terminal 100. The storage unit 206 also stores liaison information LI that defines liaison concerning operations to be performed between this image forming apparatus 200 and one or more image forming apparatuses 200 upon receiving a search request or a print instruction from the mobile terminal 100.

The storage unit 206 also stores a function management table FT indicating the functions concerning image formation performed by each image forming apparatus 200 and a job table JT indicating the content of received jobs.

The liaison information LI is stored in all the image forming apparatuses 200. However, the image data DI, function management table FT, and job table JT may be stored in only at least one image forming apparatus 200.

The first communication unit 201 is a communication interface for performing wired or wireless communication with one or more image forming apparatuses 200 according to the predetermined wireless communication standards, such as Ethernet (registered trademark), Wifi-Direct, Bluetooth, or NFC. The second communication unit 202 is a communication interface for performing wireless communication with the mobile terminal 100 according to the predetermined wireless communication standards, such as Wifi-Direct, Bluetooth, or NFC. The first and second communication units 201 and 202 may be provided as an integral module using the same communication method.

The control unit 250 includes a terminal handler 251, a print handler 259, and a basic processor 258. The control unit 250 is implemented as a dedicated processor, module, or software. Upon receiving a request from the mobile terminal 100, the control unit 250 executes processing in accordance with the liaison information LI. More specifically, the control unit 250 determines which function within the control unit 250 will be enabled on the basis of the liaison information LI.

Not all the image forming apparatuses 200 are necessary to have all the functions, which will be discussed below. That is, the functions within the control unit 250 may be different among the image forming apparatuses 200. It is sufficient if the functions within the control unit 250, that is, the terminal handler 251, a group manager 252, a liaison processor 253, an authenticating section 254, a notifying section 255, and an image forming section 256, are implemented within one group in the image forming system 800. However, it is necessary that the terminal handler 251, the authenticating section 254, and the notifying section 255 be included in each image forming apparatus 200.

The print handler 259 includes the group manager 252 and the liaison processor 253. The group manager 252 conducts negotiations with one or more image forming apparatuses 200 according to a predetermined algorithm so as to perform processing concerning the management of groups, such as forming of a group (grouping), supplying of group information to another or other image forming apparatuses 200 within the same group, and changing or updating of a formed group. When a new group is generated or an existing group is updated, information concerning the generation of a new group or the updating of an existing group is written into the liaison information LI, and the liaison information LI is supplied to all the other image forming apparatuses 200 within the group. This enables all the image forming apparatuses 200 within the group to share information that each image forming apparatus 200 belongs to this group and that each image forming apparatus 200 is supposed to operate in accordance with the liaison information LI upon receiving a request from the mobile terminal 100.

The image forming apparatus 200 may identify other image forming apparatuses 200 in the following manner. The group manager 252 searches for other image forming apparatuses 200 in the neighborhood (conducts a neighborhood search) via a wireless network, such as Wifi-Direct or Bluetooth, used for sending the generated information to the other image forming apparatuses 200, and exchanges ID information (such as an Internet protocol (IP) address, a media access control (MAC) address, a communication protocol, or an ID used during communication) with one or more image forming apparatuses 200 that have responded. For example, if Bluetooth is used, other image forming apparatuses 200 may be identified by performing master-slave communication in a piconet. The liaison information LI may be generated or updated, for example, when one of the plural image forming apparatuses 200 is started. Alternatively, a neighborhood search may be conducted on a regular basis, and then, the liaison information LI may be generated or updated. Alternatively, a group may be formed when one of the image forming apparatuses 200 first receives a search request from the mobile terminal 100. In short, the liaison information LI may be generated or updated at any time as long as the image forming apparatuses 200 may handle a search request or a print instruction from the mobile terminal 100 in cooperation with each other when receiving such a request or an instruction.

An example of grouping is shown in FIG. 5. Image forming apparatuses 200-1, 200-2, and 200-3 installed within the elevator hall RA form one group, image forming apparatuses 200-4 through 200-7 installed within the office space RC form one group, and image forming apparatuses 200-8 and 200-9 installed within the lounge space RB form one group.

An example of the structure of the liaison information LI is shown in FIG. 4. The liaison information LI includes group ID information GI and items DM2 through DM5. The group ID information GI indicates ID information for identifying a group to which the subject image forming apparatus 200 belongs (indicated by "01" in FIG. 4) and the name of this group. As the name of a group, the name by which the user 900 can easily guess the installation location, such as "copying machine corner", "copying machines in elevator hall", or "printer area", is set.

The item DM2 indicates information concerning how to handle a request received from the mobile terminal 100. More specifically, the item DM2 indicates whether the subject image forming apparatus 200 will respond to this request or request another image forming apparatus 200 to respond to the request, or none of the image forming apparatuses 200 will respond to the request (ignores this request). In addition to the information indicating whether or not a request will be responded, the method or the condition for responding to a request may be described.

For example, if a search request using Wifi (Direct mode/infrastructure mode/ad hoc mode) or ZigBee is received from the mobile terminal 100, an image forming apparatus 200 in charge of responding to a request returns its ESSID (Extended Service Set Identifier) to the mobile terminal 100, and at the same time, the other image forming apparatuses 200 within the group ignore the request. If a search request using Bluetooth is received from the mobile terminal 100, only an image forming apparatus 200 in charge of responding to a request may be shifted to a pairing mode. If a search request using a network search protocol, such as AirPrint, Bonjour, Web Services Dynamic (WSD)-Discovery, or Internet Control Message Protocol (ICMP) is received from the mobile terminal 100, the image forming apparatus 200 that has received this request may conduct negotiations with the other image forming apparatuses 200 within the group so as to select the image forming apparatus 200 which will respond to this request, and may request the selected image forming apparatus 200 to respond to the request.

When conducting negotiations with the other image forming apparatuses 200, the subject image forming apparatus 200 first conducts a neighborhood search by using a wireless network, such as Wifi-Direct or Bluetooth, so as to temporarily construct a local network. Then, the image forming apparatuses 200 connected to each other in the local network exchange information concerning the communication functions (such as the type of communication standard, the type of application (lower standard) available in the communication standard, and the version of this standard) of the image forming apparatuses 200. Then, the image forming apparatus 200 that implements the highest communication performance, or supports most protocols, or utilizes the interface of the latest version of the communication standard is selected. In this case, different image forming apparatuses 200 may be selected in accordance with the communication standards (Wifi and Bluetooth) used by the mobile terminal 100. If the image forming apparatuses 200 utilize peer-to-peer connection, they do not have to construct a local network as long as they share information concerning the above-described communication functions between the image forming apparatuses 200 within the group in advance.

The item DM3 indicates information for specifying an image forming apparatus 200 in charge of storing the image data DI within the group and an image forming apparatus 200 in charge of forming and outputting an image based on the image data DI within the group. In the example shown in FIG. 4, the image forming apparatus 200-2 is specified as an apparatus both in charge of storage and printing. As the image forming apparatus 200 in charge of storage, the image forming apparatus 200 having the highest storage capabilities (capacity and reading speed) within the group, for example, is selected. Alternatively, the image forming apparatus 200 having the highest reliability and availability within the group is selected. For example, an image forming apparatus 200 being constantly powered ON, having a high response speed, and having a sufficient backup mechanism, for example, an external storage device (such as a server or a network-attached storage (NAS)) may be selected.

The image forming apparatus 200 in charge of storage and that in charge of printing may be dynamically selected. For example, the image forming apparatus 200 in charge of storage and that in charge of printing may be selected in accordance with the operating statuses of the image forming apparatuses 200, details of a print request (the number of print copies or the image quality), the communication standard used between the mobile terminal 100 and the image forming apparatuses 200, or the communication standard used between the image forming apparatuses 200. For example, the image forming apparatus 200 that has received a print request from the mobile terminal 100 will be in charge of storage and printing. In the sub-item "apparatus in charge of printing" of the item DM3, it may be described that the function management table FT is obtained from each image forming apparatus 200, and the optimal image forming apparatus 200 will be selected on the basis of the print condition data CD and the function management table FT by using a predetermined algorithm.

The priority concerning the selection of an image forming apparatus 200 in charge of storing or printing may be determined for each image forming apparatus 200. For example, if print condition data CD is received, together with a print instruction, from the mobile terminal 100, the image forming apparatus 200 may be selected by considering the print condition data CD and the operating statuses of the other image forming apparatuses 200. The image forming apparatus 200 in charge of storage or printing does not have to be a single apparatus, and plural apparatuses may be selected. For example, if one job involves the formation of multiple images, each of plural image forming apparatuses 200 may store or print some of the images (distributed processing).

The item DM4 indicates the image forming apparatus 200 in charge of managing the generation or updating of the liaison information LI (image forming apparatus 200-3 in the example in FIG. 4).

The item DM5 indicates information how to handle the user 900 who comes to an information processing apparatus 200 to collect a printed material. The item DM5 is provided by considering the possibility that the user 900 come to an incorrect image forming apparatus 200, which is not the image forming apparatus 200 that has output a printed material. More specifically, in the item DM5, it is described that, in a case in which the subject image forming apparatus 200 has not output a printed material requested by the user 900 or if it does not store the image data DI, whether the subject image forming apparatus 200 will obtain the image data DI and output a printed material based on the image data DI by itself, or the user 900 will be informed of the correct image forming apparatus 200 that stores the image data DI or has output a printed material based on the image data DI.

Returning back to FIG. 3, the functions of the control unit 250 of the image forming apparatus 200 will be described.

Upon receiving a request from the mobile terminal 100, the terminal handler 251 handles this request in accordance with a description defined in the item DM2 of the liaison information LI.

The liaison processor 253 handles a request in accordance with a description defined in the item DM3 of the liaison information LI. More specifically, if the subject image forming apparatus 200 is not the image forming apparatus 200 specified in the item DM3, it sends the image data DI to the specified image forming apparatus 200 and instructs it to store or output a printed material based on the image data DI. In this case, if the print condition data CD has been received from the mobile terminal 100, the image forming apparatus 200 in charge of storage or printing is selected on the basis of the print condition data CD and the function management table FT.

The basic processor 258 includes the authenticating section 254, the notifying section 255, and the image forming section 256. The image forming section 256 includes a control circuit for controlling an image processor and the image forming mechanism 207. The authenticating section 254 refers to the job table JT and specifies a job input from the input unit 203 and requested by the user 900. The authenticating unit 254 may also authenticate the user (or the terminal device) which has specified the job.

The notifying section 255 refers to the job table JT, and specifies the image forming apparatus 200 in charge of printing (image formation) and supplies information concerning the specified image forming apparatus 200 to the display unit 204. The specifying of a job or the user authentication conducted when the user collects a printed material may be performed by causing a card reader provided in each image forming apparatus 200 to read an IC card in which the user ID (and the job ID) is written, instead of inputting an ID by using a touch panel of the image forming apparatus 200. Alternatively, the user authentication or the specifying of a job may be conducted by peer-to-peer near field radio communication, such as NFC, Infrared Data Association (IrDA), Bluetooth, or Wifi (ad hoc mode).

An example of the job table JT is shown in FIG. 6A. The job table JT is constituted by multiple records. A record is generated every time a print instruction is received from the mobile terminal 100. In each record, a job ID for identifying a job, an ID for identifying a user (or the mobile terminal 100 of a user) generated the job, information for identifying the image forming apparatus 200 in charge of storing image data DI used for printing, and information for identifying the image forming apparatus 200 in charge of printing on the basis of the image data DI are stored. The job ID is information necessary for the user to collect a printed material. The job ID may be issued by the image forming apparatus 200 or by the mobile terminal 100 and be supplied to the user 900. The image forming apparatus 200 in charge of storage and that in charge of printing are those decided on the basis of the information described in the items DM3 and DM4.

The job table JT is shared among all the image forming apparatuses 200. All the image forming apparatuses 200 have the same job table JT, and when a job table JT is generated or updated, any one of the image forming apparatuses 200 within a group sends the generated or updated job table JT to all the other image forming apparatuses 200 within this group, thereby allowing all the image forming apparatuses 200 to share the latest information. Alternatively, at least one of the image forming apparatuses 200 within the group may store the job table JT, and the other image forming apparatuses 200 may store information only for identifying the image forming apparatus 200 that stores the job table JT. In this case, if an image forming apparatus 200 without the job table JT receives a request to obtain a document from the user 900, it requests the image forming apparatus 200 that stores the job table JT to specify the job concerning the request.

An example of the function management table FT is shown in FIG. 6B. In the function management table FT, details of the functions concerning the image formation (print speed and image quality) and the operating statuses of all the image forming apparatuses 200 within a group are stored. The function management table FT may be stored in all the image forming apparatuses 200 or in at least one of the image forming apparatuses 200 within the group. The function management table FT is referred to by the individual elements forming the control unit 250, and may be used for at least one of the decisions concerning: how to handle a request from the mobile terminal 100; an image forming apparatus 200 which will take charge of storage; an image forming apparatus 200 which will take charge of printing; and how to handle a user who comes to an information processing apparatus 200 to collect a printed material.

FIG. 7 is a flowchart illustrating the operation performed by the image forming system 800.

In step S102, grouping processing is started in the image forming apparatus 200-3. In steps S103 and S105, negotiations for grouping are conducted among the image forming apparatuses 200-1, 200-2, and 200-3. Then, in step S104, grouping is finished. Liaison information LI generated as a result of grouping is sent from the image forming apparatus 200-3 to the image forming apparatuses 200-1 and 200-2, so that it can be shared by all the image forming apparatuses 200 belonging to this group. Thereafter, the image forming apparatuses 200-3, 200-1, and 200-2 perform operations in cooperation with each other in response to a request from the mobile terminal 100. In other words, the image forming apparatuses 200-3, 200-1, and 200-2 behave as if there were only one apparatus for the mobile terminal 100.

It is now assumed that grouping shown in FIG. 5 has been conducted and that radio waves transmitted from the mobile terminal 100 reach all the image forming apparatuses 200-1 through 200-9. In all the groups, the image forming apparatuses 200 perform operations in a similar manner. A description will be given below by focusing on the group constituted by the image forming apparatuses 200-1, 200-2, and 200-3. Upon receiving a request from the mobile terminal 100, the image forming apparatuses 200-1, 200-2, and 200-3 execute processing in accordance with the obtained liaison information LI.

Details of the processing will be described below. In step S202, the user 900 operates the mobile terminal 100 to instruct it to send a search request. Then, in step S203, the mobile terminal 100 sends a search request. Upon receiving the search request from the mobile terminal 100 in step S203, each image forming apparatus 200 handle this request in accordance with a description defined in the item DM2 of the liaison information LI. For example, in steps S206 and S208, the image forming apparatuses 200-2 and 200-3 do not respond to the request. On the other hand, in step S210, the image forming apparatus 200-1 responds to the request. More specifically, the image forming apparatus 200-1 reads the group ID information GI, and informs the mobile terminal 100 of at least the group name "elevator hall" in step S211.

In step S212, the group names obtained from the individual groups are displayed in the mobile terminal 100.

Figure 8A:
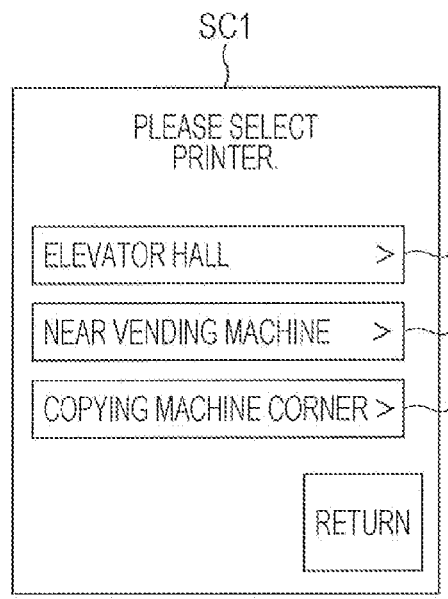
FIGS. 8A through 8C illustrate examples of screens displayed on the mobile terminal.
Figure 8B:
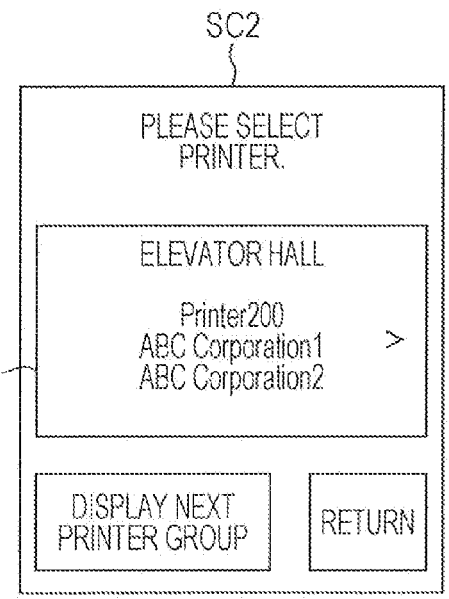
Figure 8C:
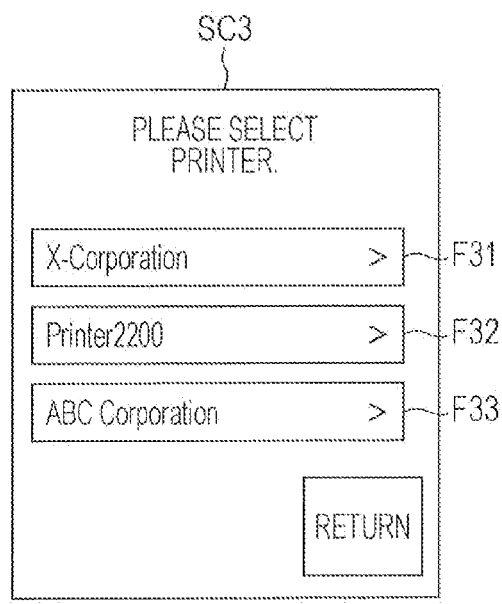

FIGS. 8A through 8C show examples of screens displayed on the mobile terminal 100 in step S212. On a screen SC1 shown in FIG. 8A, instead of the ID names of the individual image forming apparatuses 200, items F11 through F13 indicating the names of three groups are displayed so that the user 900 can select one of the items F11 through F13. Items of information for identifying the individual image forming apparatuses 200 which belong to this group are not displayed. That is, it appears to the user 900 as if there were only three image forming apparatuses accessible by the user 900.

A screen SC2 shown in FIG. 8B is an example of a screen to be displayed if the item DM2 describes that a user will be informed of the ID names of individual apparatuses in addition to the group name. In this case, the user is informed that plural printers form one group, as indicated by an item F20. However, the mobile terminal 100 is unable to select an individual printer and is able to select it only by the group name on the screen SC2.

On a screen SC3 shown in FIG. 8C, instead of group names, the ID names of image forming apparatuses 200 representing the respective groups are displayed, as indicated by items F31 through F33. The user 900 may select one of the image forming apparatuses 200.

On any of the examples of the screens SC1 through SC3, instead of displaying a list of individual image forming apparatuses 200 that are connectable to the mobile terminal 100, a user interface that reflects information concerning grouping and receives the selection of an image forming apparatus only by the group is generated.

Referring back to FIG. 7, in step S214, the user 900 refers to the screen, such as one of those shown in FIGS. 8A through 8C, and selects a desired group by referring to the group names. Then, in step S215, the user 900 specifies the image data DI and wirelessly sends a print instruction, together with the user ID, to the image forming apparatuses 200-1 through 200-3. In this case, the user 900 may add print condition data CD to the print instruction.

Upon receiving this print instruction, each of the image forming apparatuses 200-1 through 200-3 decides how to handle this instruction by referring to the item DM2 of the liaison information LI. As a result, in steps S206 and S208, the image forming apparatuses 200-2 and 200-3 ignore this instruction. On the other hand, in step S216, the image forming apparatus 200-1 specifies an image forming apparatus 200 which will take charge of storage and that will take charge of printing by referring to the liaison information LI. In this case, the image forming apparatus 200-1 refers to the function management table FT if necessary. The image forming apparatus 200-1 issues a job ID and stores information concerning the selected image forming apparatus 200 in charge of storage and that in charge of printing (in this case, the image forming apparatus 200-2 will be both in charge of storage and printing). The image forming apparatus 200-1 informs the mobile terminal 100 of the job ID.

In step S217, the image forming apparatus 200-1 sends the image data DI to the image forming apparatus 200-2 and instructs it to perform printing by using the image data DI. In step S218, upon receiving the image data DI, the image forming apparatus 200-2 forms an image on a recording medium on the basis of the image data DI and outputs the recording medium.

In step S302, the user 900 goes to the elevator hall to collect a printed material.

In step S304, the user inputs user information and the job ID by using one of the image forming apparatuses 200 within the group (in this case, the image forming apparatus 200-3). By referring to the job table JT, the image forming apparatus 200-3 conducts authentication for the user 900 and specifies the job requested by the user 900. In step S306, if the image forming apparatus 200-3 is not an apparatus in charge of printing, it informs the user 900 of the image forming apparatus 200 in charge of printing (in this case, the image forming apparatus 200-2) in accordance with the item DM5 of the liaison information LI, or obtains the image data DI from the image forming apparatus 200-2 and performs printing by itself. If the image forming apparatus 200-3 does not store the job table JT, it queries the image forming apparatus 200 which stores the job table JT within the group about the specified job ID and performs one of the operations: inquiring about information concerning the image forming apparatus 200 that has performed printing; requesting the image forming apparatus 200 in charge of printing to obtain the image data DI; and requesting the image forming apparatus 200 in charge of printing to perform printing on the basis of the image data DI.

According to the above-described exemplary embodiment, the user 900 is able to select the image forming apparatus 200 by referring to group names indicating installation locations. Accordingly, the user 900 does not have to know the associations between the ID names of image forming apparatuses 200 that are accessible from the user 900 and the installation locations thereof. Accordingly, the user 900 does not have to worry about the selection of the image forming apparatus 200 or the collection of a printed material. Even if the user 900 comes to an incorrect image forming apparatus 200 and finds that printing has been performed in another image forming apparatus 200 within the same group, both of the image forming apparatuses 200 are installed close to each other. Moreover, the user 900 is informed of the image forming apparatus 200 that has actually performed printing, so that the user 900 can smoothly collect a printed material.

The image forming apparatus 200 does not have to perform an operation that may startle other users around the image forming apparatus 200, such as turning ON an indicator, for informing the user 900 of a place where a printed material is output. It is sufficient if one apparatus within a group handles a request from the mobile terminal 100 and one apparatus within the group performs printing. Accordingly, all the image forming apparatuses 200 may not necessarily have the same functions. For example, even if some functions of image forming apparatuses within a group do not function properly, for example, some image forming apparatuses are not powered ON, the user may be able to select an image forming apparatus and instruct it to perform a certain operation without noticing the existence of such image forming apparatuses.

Even if the image forming function or the communication function does not uniform within the image forming apparatuses 200 within a group, it is still possible to select the image forming apparatus 200 optimal for a user's request in accordance with the communication protocol, the content and the condition of printing, the functions of printers, and the operating statuses thereof.

The above-described exemplary embodiment is only an example. In the image forming system 800, any type of processing concerning the image formation may be performed. For example, instead of processing for outputting a printed material, the image forming system 800 may be applicable to processing for reading (scanning) image data and processing for transferring read image data to another apparatus.

This will be discussed more specifically. In addition to the image forming function, the function of scanning image data and transferring the scanned image data (hereinafter such processing will be referred to as "scan-transfer processing") is provided in each image forming apparatus 200. In a manner similar to the exemplary embodiment, the user 900 sends a search request and selects an image forming apparatus 200. If scanning is performed by using the image forming system 800, instead of an instruction to perform printing, an instruction to set settings for scanning, and instead of print condition data CD, setting information necessary for performing scan-transfer processing (for example, the resolution for reading an image, the format of image data, and the address of a transfer destination apparatus) are sent from the mobile terminal 100 to the image forming apparatus 200 in charge of handling a request from the user 900. In this case, a job ID is issued for an instruction input from the user 900, as in the exemplary embodiment.

Then, the image forming apparatus 200 refers to the function management table FT if necessary and selects the image forming apparatus 200 suitable for performing scan-transfer processing on the basis of the setting information. The setting information is then sent to the selected image forming apparatus 200 and is stored therein.

Then, the user 900 goes to a place where the image forming apparatuses 200 of a selected group are installed and inputs the job ID (and information for identifying the user 900) into one of the image forming apparatuses 200. In this case, the user 900 may input the job ID by using a touch panel, or may send the job ID and user authenticating information stored in the mobile terminal 100 to this image forming apparatus 200 via near field radio communication. Then, the storage location in which the setting information corresponding to the job ID is stored is specified. If the specified storage location is the subject image forming apparatus 200 into which the user 900 has input the job ID, it reads the setting information from the storage unit 206. If the specified storage location is a different image forming apparatus 200, the subject image forming apparatus 200 obtains the setting information from this different image forming apparatus 200. The subject image forming apparatus 200 then informs the user 900 by using a touch panel that the read or obtained setting information will be reflected in scan-transfer processing. After checking the content of the setting information, the user 900 sets a document in the image forming apparatus 200 and inputs an instruction to perform scan-transfer processing. Then, scan-transfer processing is performed in accordance with the setting information.

If the user 900 stores image data to be transferred in the mobile terminal 100, the image data may be sent, together with setting information, from the mobile terminal 100 to the image forming apparatus 200 and may be transferred to an image forming apparatus that perform scan-transfer processing. In this case, the user 900 goes to a place where the image forming apparatuses 200 of a selected group are installed only to conduct user authentication.

In this example, the user 900 does not have to input setting information into the image forming apparatus 200 every time the user instructs it to perform scan-transfer processing. For example, if the user 900 specifies a destination by an email address, the user 900 has to input the email address character by character by using a touch panel provided in the image forming apparatus 200. In this manner, the inputting of setting information into the image forming apparatus 200 may be a burden on the user. In this example, however, if the email address is stored in the mobile terminal 100, the user 900 simply specifies this email address when sending a scanning instruction to the image forming apparatus 200.

An image forming system according to an exemplary embodiment of the invention includes plural image forming apparatuses. This image forming system includes: a first communication unit that is disposed in each of the plural image forming apparatuses and that communicates with at least another one of the plural image forming apparatuses; a second communication unit that is disposed in each of the plural image forming apparatuses and that communicates with a terminal device; an image forming unit that is disposed in each of the plural image forming apparatuses and that forms an image on a medium; a storage unit that stores liaison information which defines liaison concerning an operation between each of the plural image forming apparatuses and at least another one of the plural image forming apparatuses; a notifying unit that notifies the terminal device of the liaison information in response to an inquiry from the terminal device; a receiving unit that receives specified liaison information from the terminal device; and an execution unit that executes image formation by using the image forming unit of one of the plural image forming apparatuses. The above-described image formation includes processing for forming an image on a medium on the basis of image data provided by a user, processing for generating image data by reading a document provided by a user, processing for sending the generated image data to another apparatus, and other types of processing related to the image formation.

An image forming apparatus according to an exemplary embodiment of the invention includes: a first communication unit that communicates with at least one image forming apparatus; a second communication unit that communicates with a terminal device; an image forming unit that forms an image on a medium on the basis of image data; a storage unit that stores liaison information which defines liaison concerning an operation between the image forming apparatus and at least one image forming apparatus; and an execution control unit that executes processing in accordance with the liaison information upon receiving a request from the terminal device.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   at least one hardware processor configured to implement:
   a first communication unit configured to communicate with at least one image forming apparatus;
   a second communication unit configured to communicate with a terminal device;
   an image forming unit configured to form an image on a medium on the basis of image data;
   a storage unit configured to store liaison information which defines liaison concerning an operation between the image forming apparatus and the at least one image forming apparatus and the liaison information includes a group name which indicates a liaison group which the image forming apparatus itself belongs to;
   a notifying unit configured, in response to an inquiry from the terminal device, to notify the terminal device of the liaison information by sending, to the terminal device, the liaison information which controls the terminal device to display the group name;
   a receiving unit configured to receive specified image data and specified liaison information; and
   an execution control unit configured to execute image formation of the specified image data in accordance with the liaison information in response to receiving a user selection of the group name from the terminal device, the user selection of the group name instructing performance of the image formation by only the image forming apparatus from among the at least one image forming apparatus which belongs to the liaison group in accordance with the liaison information.

2. The image forming apparatus according to claim 1, wherein:
   the execution control unit is further configured to notify the terminal device of identification information upon receiving an inquiry from the terminal device.

3. The image forming apparatus according to claim 2, wherein the identification information indicates an installation location of the image forming apparatuses which belong to the liaison group.

4. The image forming apparatus according to claim 1, wherein, in the liaison information, it is described that the image forming apparatus does not respond to an inquiry from the terminal device.

5. The image forming apparatus according to claim 1, wherein:
   the liaison information further includes information specifying which of the image forming apparatus and the at least one image forming apparatus will take charge of the image formation within the liaison group; and the execution control unit is further configured to send, if the image forming apparatus is not specified by the specified liaison information, the image data to a specified image forming apparatus specified by the liaison information and to instruct the specified image forming apparatus to perform the image formation on the basis of the image data.

6. The image forming apparatus according to claim 5, wherein:
the liaison information further includes function information concerning an image forming function provided in each of image forming apparatuses within the liaison group;
an inquiry from the terminal device includes condition information indicating a condition concerning image formation; and
the execution control unit is further configured to select one image forming apparatus within the liaison group which will take charge of image formation, on the basis of the condition information obtained from the terminal device and the function information.

7. The image forming apparatus according to claim 5, wherein the at least one hardware processor is further configured to implement:
a generating unit configured to generate identification information concerning the terminal device,
wherein the execution control unit is further configured to send the generated identification information to the at least one image forming apparatus by using the first communication unit.

8. The image forming apparatus according to claim 5, wherein the notifying unit is further configured to notify a user of the selected one image forming apparatus which will take charge of image formation.

9. The image forming apparatus according to claim 1,
wherein the execution control unit is configured to execute image formation of the image data which is retrieved from at least one of a plurality of image forming apparatuses which belong to the liaison group.

10. The image forming apparatus according to claim 1, wherein the at least one hardware processor is further configured to execute:
an input unit configured to receive a user input which includes the user selection, instructing performance of the image formation, and user information which identifies a user;
wherein the receiving unit is further configured to receive the user information; and
wherein the executing control unit is further configured to execute image formation of the image data which is retrieved from at least one of a plurality of image forming apparatuses, which belong to the liaison group, based on the user information in response to receiving the user information by the input unit, in response to the user input of the input unit.

11. The image forming apparatus according to claim 1, wherein the liaison information is configured to control the terminal device to display the group name and names of a plurality of image forming apparatuses including the image forming apparatus and the at least one image forming apparatus.

12. The image forming apparatus according to claim 1, wherein the liaison information is configured to control the terminal device to display the group name as a part of a first user interface display screen, and
the liaison information is further configured to control the terminal device to display names of a plurality of image forming apparatuses as a part of a second user interface display screen, the plurality of image forming apparatuses including the image forming apparatus and the at least one image forming apparatus.

13. The image forming apparatus according to claim 1, wherein the user selection of the group name is transmitted to each of a plurality of image forming apparatus, including the image forming apparatus and the at least one image forming apparatus, of the group in response to the user selection, and
the liaisons information stored in the image forming apparatus indicates that the other image forming apparatuses are instructed to ignore the user selection in response to receiving the user selection.

14. The image forming apparatus according to claim 1, wherein the user selection of the group name is from a display by the terminal device, the display not displaying an indication of individual ones of image forming apparatuses, including the image forming apparatus and the at least one image forming apparatus, of the group.

15. The image forming apparatus according to claim 1, wherein the group name indicates a location at which the group of image forming apparatuses, including the image forming apparatus and the at least one image forming apparatus, is located.

16. An image forming system including a plurality of image forming apparatuses and a terminal device, the image forming system comprising:
the plurality of image forming apparatuses respectively comprising:
at least one hardware processor configured to implement:
a first communication unit configured to communicate with at least another one of the plurality of image forming apparatuses;
a second communication unit configured to communicate with the terminal device;
an image forming unit configured to form an image on a medium;
a storage unit configured to store liaison information which includes at least a group name and a storage information, the group name indicates a liaison group which the image forming apparatus itself belongs to, the storage information notes storage location of received image data;
a notifying unit configured to notify the terminal device of the liaison information in response to an inquiry from the terminal device;
a receiving unit configured to receive specified image data, specified liaison information and a user information from the terminal device;
an input unit configured to receive a user instruction comprising a user selection of the group name from the terminal device, the user selection of the group name instructing performance of image formation, and the user instruction further comprising the user information;
a retrieval unit configured to retrieve the specified image data from one of the plurality of image forming apparatuses based on the storage location; and
an execution unit configured to execute image formation in response to receiving the user selection of the group name by only the image forming apparatus from among the at least one image forming apparatus which belong to the liaison group in accordance with the liaison information;

the terminal device comprising;
- a display; and
- at least one hardware processor configured to implement:
    - a requesting unit configured to request the plurality of image forming apparatuses for the liaison information;
    - a receiving unit configured to receive the liaison information;
    - a display control unit configured to control the display to display the group name;
    - an input unit configured to receive a selection of the specified image data and the group name; and
    - a sending unit configured to send the specified image data, the specified liaison information and the user information.

17. The image forming system of claim 16, wherein the notifying unit is further configured to notify a user of at least one of the image forming apparatuses, of the plurality of image forming apparatuses, and that the at least one image forming apparatus has performed an image forming process requested by the user by referring to a job table stored in parallel at each of the plurality of image forming apparatuses.

18. The image forming system of claim 17, wherein each of the plurality of image forming apparatuses are further configured to notify the user of the at least one other image forming apparatus in response to a user entry of a job identification into one of the image forming apparatuses which did not perform the image forming process requested by the user.

19. The image forming system of claim 16, wherein the liaison information further comprises a user defined name of each of the image forming apparatuses, a terminal handling policy comprising information of a user search request for a job in response to a user entry of a job identification into one of the image forming apparatuses, a terminal handling policy comprising information of a user print request, a print policy comprising information of one of the image forming apparatuses in charge of storing the job identification, a print policy comprising information of one of the image forming apparatuses in charge of printing an image according to the user print request, an information of one or more of the image forming apparatuses managing image formation in response to the user print request, and a collect policy comprising a protocol of responding to the user search request.

20. The image forming system of claim 16, wherein each of the image forming apparatuses is configured to perform image formation.

21. The image forming system of claim 16, wherein both of the liaison information and a job data are stored in a job table stored in parallel in each of the plurality of image forming apparatuses.

22. The image forming system of claim 16, wherein each of the image forming apparatuses is configured to perform at least one of printing, scanning, copying and faxing.

23. A non-transitory computer readable medium storing a program causing a computer to execute a process, the process comprising:
- obtaining liaison information which defines liaison concerning an operation between the image forming apparatus and at least one image forming apparatus by communicating with the at least one image forming apparatus and the liaison information includes a group name which indicates a liaison group which the image forming apparatus itself belongs to;
- notifying a terminal device of the liaison information in response to an inquiry from the terminal device, by sending, to the terminal device, the liaison information which controls the terminal device to display the group name;
- receiving specified image data and specified liaison information; and
- executing image formation of the specified image data in accordance with the obtained liaison information in response to a user selection of the group name at the terminal device, the user selection of the group name instructing performance of the image formation by only the image forming apparatus from among the at least one image forming apparatus which belongs to the liaison group in accordance with the liaison information.

\* \* \* \* \*